(12) United States Patent
Ahuja et al.

(10) Patent No.: US 9,971,890 B2
(45) Date of Patent: **\*May 15, 2018**

(54) SECURING THERMAL MANAGEMENT PARAMETERS IN FIRMWARE FROM CYBER ATTACK

(71) Applicant: Intel Corporation, Santa Clara, CA (US)

(72) Inventors: Sandeep Ahuja, University Place, WA (US); Robin Steinbrecher, Olympia, WA (US); David Richardson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/164,084

(22) Filed: May 25, 2016

(65) Prior Publication Data

US 2016/0267269 A1    Sep. 15, 2016

Related U.S. Application Data

(63) Continuation of application No. 13/977,831, filed as application No. PCT/US2012/030861 on Mar. 28, 2012, now Pat. No. 9,355,249.

(51) Int. Cl.
*G06F 21/55* (2013.01)
*G06F 21/00* (2013.01)
(Continued)

(52) U.S. Cl.
CPC ............ *G06F 21/554* (2013.01); *G06F 1/206* (2013.01); *G06F 21/00* (2013.01); *G06F 21/572* (2013.01);
(Continued)

(58) Field of Classification Search
CPC .............................. G06F 21/554; G06F 21/00
See application file for complete search history.

(56) References Cited

U.S. PATENT DOCUMENTS

| 5,950,006 A | * | 9/1999 | Crater | ................ G05B 19/0426 717/127 |
| 6,201,996 B1 | * | 3/2001 | Crater | ................ G05B 19/0421 700/69 |

(Continued)

FOREIGN PATENT DOCUMENTS

| TW | 200846889 A | 12/2008 |
| WO | 2006089352 A1 | 8/2006 |

(Continued)

OTHER PUBLICATIONS

International Search Report and Written Opinion received for PCT Application No. PCT/US2012/030861, dated Nov. 28, 2012, 9 pages.

(Continued)

*Primary Examiner* — Mahfuzur Rahman
(74) *Attorney, Agent, or Firm* — Jordan IP Law, LLC

(57) ABSTRACT

Methods and systems may provide for identifying a thermal management setting in a computing system, and comparing the thermal management setting to valid configuration information. In addition, the thermal management setting may be modified if it does not comply with the valid configuration information, wherein the modification can cause the thermal management setting to comply with the valid configuration information. Additionally, a threat risk notification can be initiated in order to notify users of the non-compliance.

12 Claims, 2 Drawing Sheets

(51) Int. Cl.
  *G06F 1/20* (2006.01)
  *G06F 21/57* (2013.01)
(52) U.S. Cl.
  CPC ..... *G06F 2221/034* (2013.01); *Y02B 60/1275* (2013.01)

(56) References Cited

U.S. PATENT DOCUMENTS

| | | | |
|---|---|---|---|
| 8,144,022 B2* | 3/2012 | Olpak | G01M 3/2807 340/606 |
| 8,224,198 B2 | 7/2012 | Kubo | |
| 8,669,880 B2 | 3/2014 | Tran | |
| 8,798,806 B2 | 8/2014 | Lev et al. | |
| 2005/0174737 A1 | 8/2005 | Meir | |
| 2008/0269954 A1 | 10/2008 | Lev et al. | |
| 2009/0204852 A1* | 8/2009 | Diggs | G06F 11/008 714/42 |
| 2009/0299543 A1 | 12/2009 | Cox et al. | |
| 2011/0074588 A1* | 3/2011 | Olpak | G01M 3/2807 340/606 |
| 2011/0265191 A1 | 10/2011 | Russo et al. | |
| 2013/0015978 A1* | 1/2013 | Tran | G06F 1/20 340/657 |

FOREIGN PATENT DOCUMENTS

| | | |
|---|---|---|
| WO | 2008133988 A1 | 11/2008 |
| WO | 2013147760 A1 | 10/2013 |

OTHER PUBLICATIONS

International Preliminary Report on Patentability received for PCT Application No. PCT/US2012/030861, dated Oct. 9, 2014, 6 pages.
Dadvar et al., "Potential Thermal Security Risks", 21st IEEE SEMI-THERM Symposium, Mar. 15, 2005, 6 pages, IEEE, Piscataway, NJ.
Extended European Search Report for European Patent Application No. EP12873046.2, dated Oct. 30, 2015, 8 pages.
Office Action for Taiwanese Patent Application No. 102106220, dated Oct. 21, 2014, 20 pages including 8 pages of English translation.
Office Action for U.S. Appl. No. 13/977,831, dated Feb. 24, 2015, 20 pages, United States Patent and Trademark Office.
Notice of Allowance for U.S. Appl. No. 13/977,831, dated Sep. 11, 2015, 14 pages, United States and Patent Trademark Office.
Notice of Allowance for U.S. Appl. No. 13/977,831, dated Feb. 4, 2016, 18 pages, United States Patent and Trademark Office.
Ray et al., "Smart Power Grid Security: A Unified Risk Management Approach", 2010 IEEE International Carnahan Conference on Security Technology, Oct. 2010, 10 pages, IEEE, San Jose, CA.

* cited by examiner

SECURING THERMAL MANAGEMENT PARAMETERS IN FIRMWARE FROM CYBER ATTACK

CROSS-REFERENCE TO RELATED APPLICATIONS

The present application is a continuation of U.S. National Phase patent application Ser. No. 13/977,831 filed on Jan. 15, 2014, issued as U.S. Pat. No. 9,355,249 on May 31, 2016, which claims benefit to International Patent Application No. PCT/US2012/030861 filed on Mar. 28, 2012.

BACKGROUND

Technical Field

Embodiments generally relate to thermal management in computing systems. More particularly, embodiments relate to securing thermal management parameters from cyber attack.

Discussion

Conventional computing systems may include firmware that uses thermal management parameters to control fans and throttle memory, processors, etc., wherein the thermal management parameters may be vulnerable to attack. For example, a hacker could issue a command to set both the high fan speed and the low fan speed to zero, which can essentially turn the fans off under all conditions. Indeed, such an attack could cause a system shutdown as well as permanent damage to the components of the system. Moreover, datacenter operators may not be aware of the hardware/BIOS (basic input output system) or firmware details of the thermal control techniques in place. Accordingly, it may take a considerable amount of time to recover from the attack.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
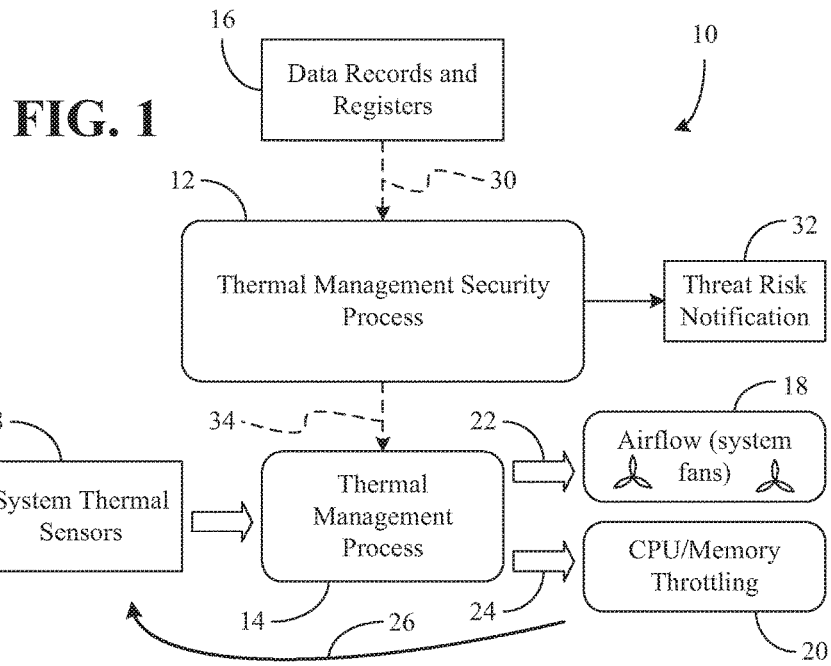
FIG. 1 is a block diagram of an example of an architecture having a thermal management security process according to an embodiment.

Turning now to FIG. 1, an architecture 10 is shown in which a thermal management security process 12 is disposed between a thermal management process 14 and one or more data records and registers 16 that are used by the thermal management process 14 to control airflow components 18 and/or throttling components 20 in a computing system. The computing system may include, for example, a server, personal computer (PC), personal digital assistant (PDA), notebook/netbook computer, desktop computer, smart tablet, wireless smart phone, media player, smart television, mobile Internet device (MID), etc. In particular, the data records and registers 16 may include user configurable sensor data records (SDRs), chipset registers, and so forth, that contain thermal management parameters of the computing system such as fan speeds, sensor thresholds, thermal offsets, forced throttling states, etc. Accordingly, the illustrated thermal management process 14 issues fan control output(s) 22 (e.g., pulse width modulation/PWM signals) to the airflow components 18, as well as throttling related output(s) 24 (e.g., memory thermal offset values, forced throttling signals) to the throttling components 20 in order to achieve a cooling result 26 that is detected in a feedback loop by one or more thermal sensors 28 of the computing system.

As will be discussed in greater detail, the security process 12 may compare the "non-qualified" thermal management parameters 30 retrieved from the data records and registers 16 to valid configuration information, and modify the thermal management parameters if they do not comply with the valid configuration information. The valid configuration information may specify, for example, what ranges of SDR fan control data are considered acceptable and what are considered unacceptable (e.g., settings that could result in overheating the system and subsequent shutdown). The valid configuration information may be part of a controller firmware image that is digitally signed and only modifiable by loading a different controller firmware image onto the computing system. Since the image is signed, its origin and authenticity can be guaranteed in such an approach.

If the non-qualified thermal management parameters 30 do not comply with the valid configuration information, the illustrated security process 12 generates a threat risk notification 32 and modifies the thermal management parameters so that they comply with the valid configuration information. If the non-qualified thermal management parameters 30 already comply with the valid configuration information, they may be passed along to the thermal management process 14 unmodified. In either instance, the thermal management process 14 is provided with "qualified" thermal management parameters 34, in the example shown. The security process 12 may be triggered by detection of a change in the thermal management parameters and/or a thermal throttling condition (e.g., excessive throttling, persistent excessively low fan speeds), conducted on a periodic basis (e.g., every five seconds), etc., or any combination thereof.

Figure 2:
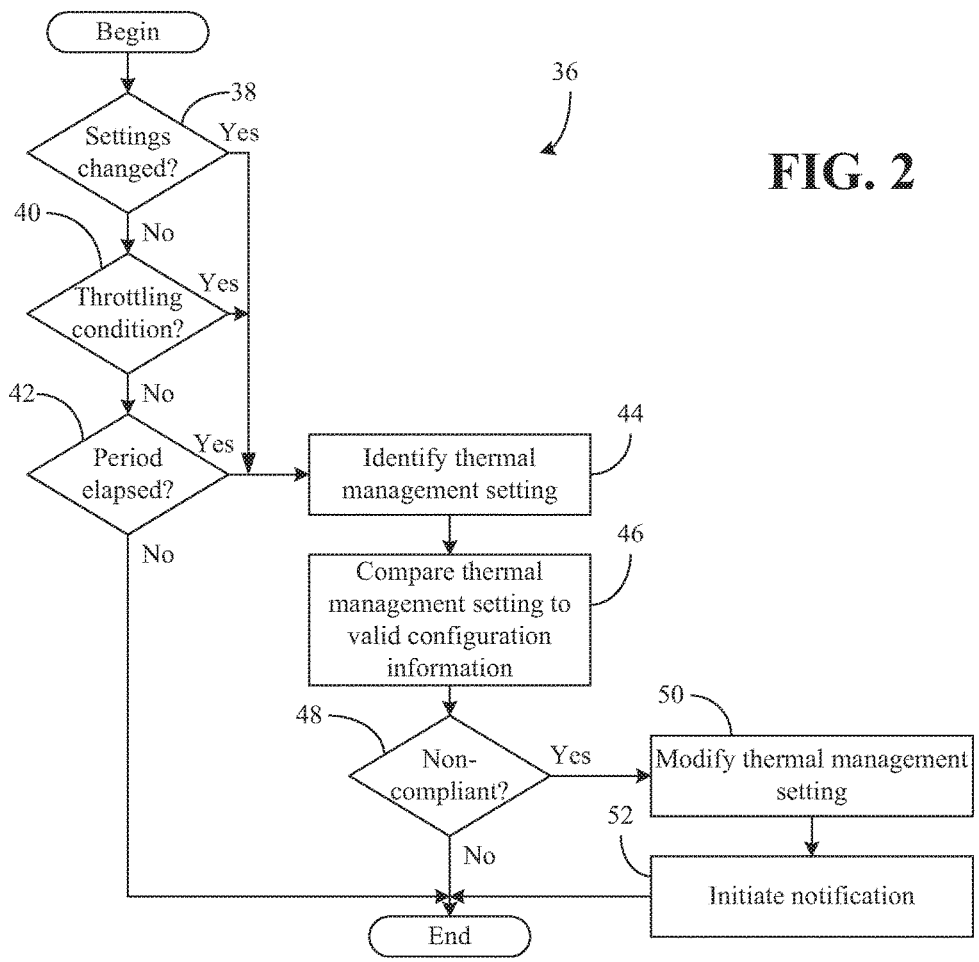
FIG. 2 is a flowchart of an example of a method of protecting thermal management parameters from attack according to an embodiment.

FIG. 2 shows a method 36 of protecting thermal management parameters from attack. The method 36 may be implemented as a set of executable logic instructions stored in at least one machine- or computer-readable storage medium such as random access memory (RAM), read only memory (ROM), programmable ROM (PROM), flash memory, firmware, microcode, etc., in configurable logic such as programmable logic arrays (PLAs), field programmable gate arrays (FPGAs), complex programmable logic devices (CPLDs), in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 36 may be written in any combination of one or more programming languages, including an object oriented programming language such as C++ or the like and conventional procedural programming languages, such as the "C" programming language or similar programming languages. Moreover, various aspects of the method 36 could be implemented as embedded logic of a processor using any of the aforementioned circuit technologies.

Illustrated processing block 38 determines whether one or more thermal management settings of a computing system have been changed. If not, block 40 may determine whether a throttling condition, such as excessive throttling of a processor and/or memory device, exists. If no such condition is present, a determination may also be made at block 42 as to whether a predetermined time period has expired. If a thermal management setting has been changed, the throttling condition is present, or the predetermined time period has expired, illustrated block 44 identifies one or more un-qualified thermal management settings, wherein the un-qualified thermal management settings may be compared to valid configuration information at block 46. If it is determined at block 48 that the un-qualified thermal management settings do not comply with the valid configuration information, block 50 can modify the non-compliant thermal management settings so that they are compliant. Thus, for example, the modification at block 50 might involve resetting a fan speed, sensor threshold and/or thermal offset, placing a component of the computing system in a throttling state (or vice versa), and so forth. Illustrated block 52 provides for initiating a threat risk notification via, for example, creating a system event log (SEL) entry and/or network alert.

Figure 3:
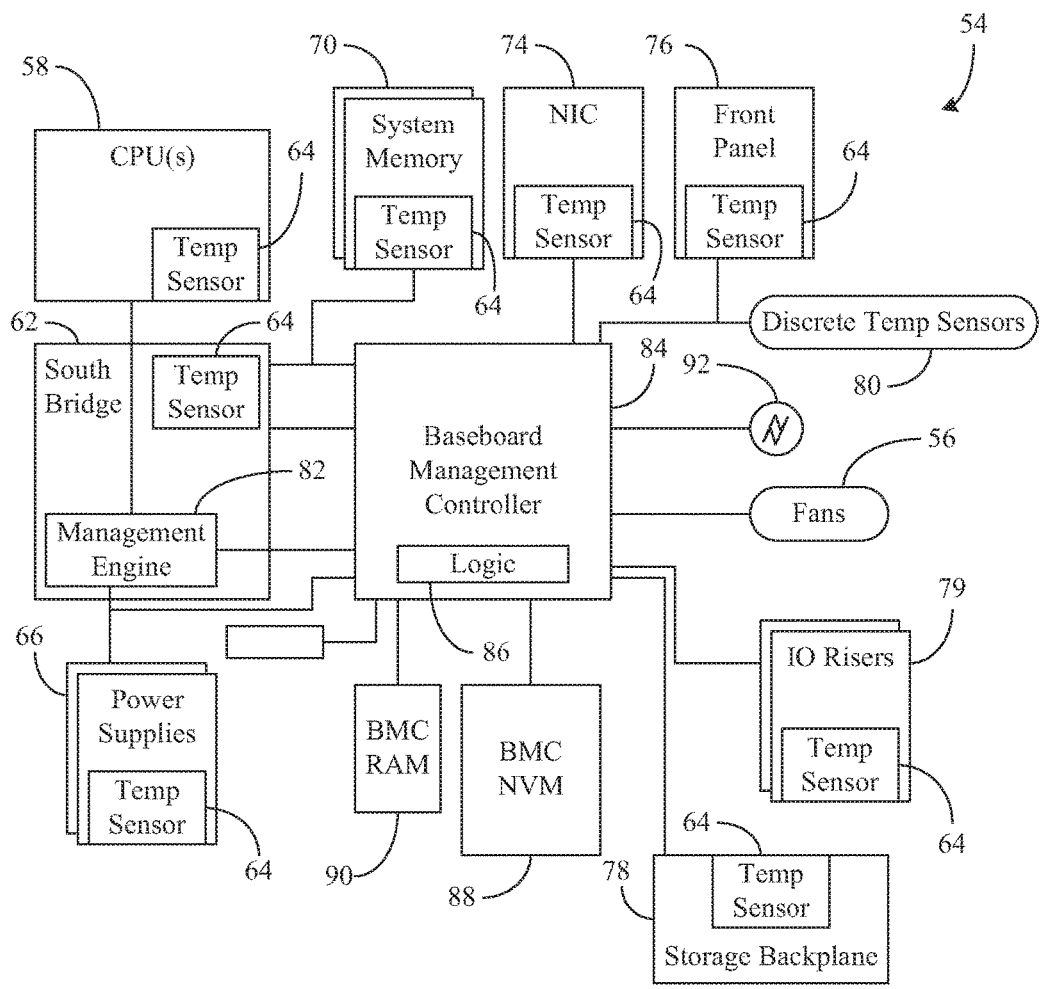
FIG. 3 is a block diagram of an example of a computing system according to an embodiment.

Turning now to FIG. 3, a computing system 54 is shown. The illustrated computing system 54 may include, for example, a server, PC, PDA, notebook/netbook computer, desktop computer, smart tablet, wireless smart phone, media player, smart television, MID, etc., or any combination thereof. The computing system may generally include various temperature sensors to detect overheating, wherein the overheating can be addressed through the control of fans 56 and/or the throttling of heat-generating components. For example, one or more central processing units (CPUs) 58, an interconnect such as a "South Bridge" chip 62, power supplies 66, system memory 70, a network interface controller (NIC) 74, a front panel 76, a storage backplane 78 and one or more input/output (IO) risers 79 could all be equipped with temperature sensors 64 capable of capturing thermal data related to the operation of the computing system 54. Moreover, one or more discrete temperature sensors 80 may obtain thermal measurements, wherein the thermal data can be used in a cooling feedback loop, as already discussed. In addition, CPU and/or South Bridge internal logic such as a management engine 82 may be used to conduct throttling activities to maintain the computing system 54 at an acceptable thermal operating point and/or limit system power consumption.

The illustrated computing system 54 also includes a controller 84 such as a baseboard management controller (BMC) having logic 86 configured to identify thermal management settings in the computing system 54, compare the thermal management settings to valid configuration information, modify the thermal management settings if the thermal management settings do not comply with the valid configuration information, and initiate a threat risk notification via, for example, an SEL entry stored in non-volatile memory (NVM) 88, the NIC 74 (e.g., network alert), the front panel 76, and/or one or more fault light emitting diodes (LEDs) 92. The modification of the thermal management settings can cause the thermal management settings to comply with the valid configuration information.

In one example, the logic 86 might retrieve the thermal management settings from SDRs stored in the NVM 88 or from other registers in the computing system 54. In the illustrated example, the controller 84 includes dedicated RAM 90, wherein the RAM 90 and the system memory 70 could include, for example, double data rate (DDR) synchronous dynamic RAM (SDRAM, e.g., DDR3 SDRAM JEDEC Standard JESD79-3C, April 2008) modules. The modules of the system memory 76 and/or controller RAM 90 may be incorporated into a single inline memory module (SIMM), dual inline memory module (DIMM), small outline DIMM (SODIMM), and so forth. In one example, the system memory 70 is a potential source of a significant amount of heat during operation of the computing system 54.

The illustrated CPUs 58 may include one or more processor cores (not shown) to execute one or more drivers associated with a host OS (operating system) and/or application software, wherein each core may be fully functional with instruction fetch units, instruction decoders, level one (L1) cache, execution units, and so forth. In one example, the CPUs 58 are also a potential source of a significant amount of heat during operation of the computing system 54.

The NIC 74 could provide off-platform communication functionality for a wide variety of purposes such as, for example, cellular telephone (e.g., W-CDMA (UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. In one example, the NIC 74 is also a potential source of a significant amount of heat during operation of the computing system 54.

Embodiments may therefore provide for a computer implemented method in which a thermal management setting in a computing system is identified. The method can provide for comparing the thermal management setting to valid configuration information, and modifying the thermal management setting if the thermal management setting does not comply with the valid configuration information.

Embodiments may also include a computing system having a fan, a temperature sensor, non-volatile memory to store a thermal management setting, and logic to identify the thermal management setting. In addition, the logic can compare the thermal management setting to valid configuration information, and modify the thermal management setting if the thermal management setting does not comply with the valid configuration information.

Additionally, embodiments can include at least one computer readable storage medium comprising a set of instructions which, if executed by a processor, cause a computing system to identify a thermal management setting in the computing system. The instructions may also cause the computing system to compare the thermal management setting to valid configuration information, and modify the thermal management setting if the thermal management setting does not comply with the valid configuration information.

Other embodiments may provide for a computer implemented method in which one or more of a data record in a computing system and a register setting in a computing system are accessed to identify a thermal management setting. The thermal management setting can include one or more of a fan speed, a sensor threshold, a thermal offset, and a forced throttling state. The method may also provide for comparing the thermal management setting to valid configuration information and modify the thermal management setting if the thermal management setting does not comply with the valid configuration information, wherein modifying the thermal management setting causes the thermal management setting to comply with the valid configuration information. In addition, a threat risk notification may be initiated via one or more of a system event log entry and a network alert.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be functional, compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:
1. A system comprising:
non-volatile memory including one or more of a data record or a register, wherein thermal management parameters are contained in the one or more of the data record or the register;
at least one of an airflow component or a throttling component; and
logic, implemented at least partly in one or more of configurable logic or fixed-functionality hardware, to:
retrieve the thermal management parameters from the non-volatile memory, the thermal management parameters being settings to control at least one of the airflow component or the throttling component;
determine, from the thermal management parameters, if one or more of a thermal management setting has changed or a throttling condition exists;
compare one or more of the thermal management setting or the throttling condition to valid configuration information;
modify, by the one or more of the configurable logic or the fixed-functionality hardware, one or more of the thermal management setting or the throttling condition; and
generate a threat risk notification if one or more of the thermal management setting or the throttling condition do not comply with the valid configuration information.

2. The system of claim 1, wherein modification of the thermal management setting includes resetting one or more of a fan speed, a sensor threshold, a thermal offset, or a throttling state.

3. The system of claim 2, further including:
the airflow component, wherein the fan speed is to be associated with the airflow component;
the throttling component, wherein the throttling state is to be associated with the throttling component; and
a system thermal sensor, wherein the sensor threshold is to be associated with the system thermal sensor.

4. The system of claim 1, wherein the valid configuration information specifies acceptable ranges of sensor data records (SDRs) for fan control data.

5. The system of claim 1, wherein the threat risk notification is to be initiated via one or more of a system event log (SEL) or a network alert.

6. At least one non-transitory computer readable storage medium comprising a set of programming instructions which, if executed by a processor, cause a computing system to:
retrieve thermal management parameters from non-volatile memory including one or more of a data record or a register in the computing system, the thermal management parameters being contained in the one or more of the data record or the register, the thermal management parameters being settings to control at least one of an airflow component or a throttling component;
determine, from the thermal management parameters, if one or more of a thermal management setting has changed or a throttling condition exists;
compare one or more of the thermal management setting or the throttling condition to valid configuration information;

modify, by the set of the programming instructions, one or more of the thermal management setting or the throttling condition; and generate a threat risk notification if one or more of the thermal management setting or the throttling condition do not comply with the valid configuration information.

7. The medium of claim 6, wherein the instructions, if executed, cause the computing system to modify the thermal management setting by resetting one or more of a fan speed, a sensor threshold, a thermal offset, or a throttling state.

8. The medium of claim 6, wherein the valid configuration information specifies acceptable ranges of sensor data records (SDRs) for fan control data.

9. The medium of claim 6, wherein the threat risk notification is initiated via one or more of a system event log (SEL) or a network alert.

10. The system of claim 1, wherein the logic is to control at least one of the airflow component or the throttling component based upon the modified one or more of the thermal management setting or the throttling condition.

11. The medium of claim 6, wherein the instructions, if executed, cause the computing system to control at least one of the airflow component or the throttling component based upon the modified one or more of the thermal management setting or the throttling condition.

12. A system comprising:
non-volatile memory including one or more of a data record or a register, thermal management parameters being contained in the one or more of the data record or the register; and
logic, implemented at least partly in one or more of configurable logic or fixed-functionality hardware, to:
retrieve the thermal management parameters from the non-volatile memory;
determine, from the thermal management parameters, if a throttling condition exists;
compare the throttling condition to valid configuration information;
modify, by the one or more of the configurable logic or the fixed-functionality hardware, the throttling condition; and
generate a threat risk notification if the throttling condition does not comply with the valid configuration information.

* * * * *